United States Patent
Kikuchi et al.

(10) Patent No.: US 11,145,862 B1
(45) Date of Patent: Oct. 12, 2021

(54) POSITIVE ELECTRODE ACTIVE SUBSTANCE FOR LITHIUM SECONDARY BATTERY, METHOD FOR PRODUCING THE SAME AND LITHIUM SECONDARY BATTERY

(71) Applicant: NIPPON CHEMICAL INDUSTRIAL CO., LTD., Tokyo (JP)

(72) Inventors: Masahiro Kikuchi, Tokyo (JP);
Tomonao Naruhashi, Tokyo (JP);
Minoru Fukuchi, Tokyo (JP)

(73) Assignee: NIPPON CHEMICAL INDUSTRIAL CO., LTD., Tokyo (JP)

(*) Notice: Subject to any disclaimer, the term of this patent is extended or adjusted under 35 U.S.C. 154(b) by 0 days.

(21) Appl. No.: 17/273,396

(22) PCT Filed: Oct. 9, 2019

(86) PCT No.: PCT/JP2019/039747
§ 371 (c)(1),
(2) Date: Mar. 4, 2021

(87) PCT Pub. No.: WO2020/080210
PCT Pub. Date: Apr. 23, 2020

(30) Foreign Application Priority Data

Oct. 15, 2018 (JP) .............................. JP2018-194172

(51) Int. Cl.
*H01M 4/52* (2010.01)
*H01M 4/04* (2006.01)
*H01M 10/05* (2010.01)
*H01M 4/525* (2010.01)
*H01M 10/0525* (2010.01)
*H01M 4/02* (2006.01)

(52) U.S. Cl.
CPC ......... *H01M 4/525* (2013.01); *H01M 4/0471* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2009/0104532 | A1 | 4/2009 | Hosoya |
| 2012/0273737 | A1 | 11/2012 | Ooishi |
| 2016/0276658 | A1 | 9/2016 | Choi et al. |

FOREIGN PATENT DOCUMENTS

| JP | H08-264183 A | 10/1996 |
| JP | 2005-123111 A | 5/2005 |
| JP | 2008-147160 A | 6/2008 |
| JP | 2009-43477 A | 2/2009 |
| JP | 2009-104805 A | 5/2009 |
| JP | 2012-74366 A | 4/2012 |
| JP | 2013-182757 A | 9/2013 |
| JP | 2013-182758 A | 9/2013 |
| JP | 2016-143539 A | 8/2016 |
| JP | 2019-179758 A | 10/2019 |
| KR | 10-2008-0099132 A | 11/2008 |
| KR | 10-2009-0078128 A | 7/2009 |
| WO | 2011/043296 A1 | 4/2011 |

OTHER PUBLICATIONS

Decision to Grant a Patent dated Apr. 7, 2021, issued in Japanese Patent Application No. 2018-194172, with English machine translation.
International Search Report dated Dec. 24, 2019, issued in counterpart International Application No. PCT/JP2019/039747 (2 pages).

*Primary Examiner* — Barbara L Gilliam
*Assistant Examiner* — Angela J Martin
(74) *Attorney, Agent, or Firm* — Westerman, Hattori, Daniels & Adrian, LLP

(57) ABSTRACT

The positive electrode active substance for a lithium secondary battery includes a mixture of a titanium-containing lithium cobalt composite oxide particle and an inorganic fluoride particle. The method for producing a positive electrode active substance for a lithium secondary battery includes a first step of subjecting a titanium-containing lithium cobalt composite oxide particle and an inorganic fluoride particle to a mixing treatment to thereby obtain a mixture of the titanium-containing lithium cobalt composite oxide particle and the inorganic fluoride particle. The lithium secondary battery uses, as a positive electrode active substance, the positive electrode active substance for a lithium secondary battery of the present invention.

14 Claims, No Drawings

POSITIVE ELECTRODE ACTIVE SUBSTANCE FOR LITHIUM SECONDARY BATTERY, METHOD FOR PRODUCING THE SAME AND LITHIUM SECONDARY BATTERY

TECHNICAL FIELD

The present invention relates to a positive electrode active substance for a lithium secondary battery, a method for producing the same, and a lithium secondary battery using the positive electrode active substance.

BACKGROUND ART

In recent years, along with rapid progress of making household appliances portable and cordless, lithium ion secondary batteries have been put in practical use as power sources of small electronic devices such as laptop personal computers, mobile phones and video cameras. With regard to the lithium ion secondary batteries, since Mizushima et al. reported in 1980 that lithium cobaltate is useful as a positive electrode active substance of a lithium ion secondary battery, research and development of lithium-based composite oxides has been actively progressed and many proposals have been made.

Lithium secondary batteries using lithium cobaltate, however, have a problem of deterioration of cycle characteristics due to dissolving-out of cobalt atoms, and the like.

Patent Literature 1 below proposes a lithium secondary battery using, as a positive electrode active substance, a lithium cobalt-based composite oxide having an existence proportion of titanium on the particle surface of lithium cobaltate of 20% or higher. Patent Literature 2 below proposes a positive electrode active substance for a lithium secondary battery composed of a lithium transition metal composite oxide containing 0.20 to 2.00% by weight of Ti atoms, wherein as the positive electrode active substance, used is a lithium cobalt-based composite oxide in which the above Ti atoms are present from the particle surface of the lithium transition metal composite oxide to the depth direction and have a concentration gradient becoming the maximum at the particle surface. Further Patent Literature 3 and Patent Literature 4 below propose using, as a positive electrode active substance, a lithium cobalt composite oxide containing Sr atoms and Ti atoms.

CITATION LIST

Patent Literature

Patent Literature 1: Japanese Patent Laid-Open No. 2005-123111
Patent Literature 2: International Publication No. WO2011/043296
Patent Literature 3: Japanese Patent Laid-Open No. 2013-182758
Patent Literature 4: Japanese Patent Laid-Open No. 2013-182757

SUMMARY OF INVENTION

Technical Problem

Even these conventional technical methods, however, still have the problem of deterioration of cycle characteristics. High voltage tolerance is demanded for capacity enhancement and energy enhancement of lithium secondary batteries, and lithium secondary batteries in which cycle characteristics are improved, the drop of the average operation voltage is small, the average operation voltage is maintained high, and the energy density retention rate is high are demanded.

Therefore, an object of the present invention is to provide a positive electrode active substance for a lithium secondary battery which is excellent in cycle characteristics, is small in the drop of the average operation voltage, maintains the average operation voltage high, and can make the energy density retention rate high, an industrially advantageous method for producing the same, and a lithium secondary battery having excellent cycle characteristics and average operation voltage characteristic and a high energy density retention rate.

Solution to Problem

As a result of exhaustive studies in consideration of the above real situation, the present inventors have found that by using a mixture of a titanium-containing lithium cobalt composite oxide particle and an inorganic fluoride particle as a positive electrode active substance for a lithium secondary battery, a lithium secondary battery having excellent cycle characteristics, being small in the drop of the average operation voltage, maintaining the average operation voltage high, and being high in the energy density retention rate can be made; and this finding has led to the completion of the present invention.

That is, the present invention (1) provides a positive electrode active substance for a lithium secondary battery comprising a mixture of a titanium-containing lithium cobalt composite oxide particle and an inorganic fluoride particle.

Then, the present invention (2) provides the positive electrode active substance for a lithium secondary battery according to (1), wherein the content of Ti in the titanium-containing lithium cobalt composite oxide particle is, in terms of Ti atoms, 0.05 to 2.0% by mol with respect to Co atoms in the lithium cobalt composite oxide particle.

Then, the present invention (3) provides the positive electrode active substance for a lithium secondary battery according to (1) or (2), wherein the titanium-containing lithium cobalt composite oxide particle comprises one or two or more selected from the group consisting of Ca, Mg, Sr, Zr, Al, Nb, B and W (M elements).

Then, the present invention (4) provides the positive electrode active substance for a lithium secondary battery according to (3), wherein the titanium-containing lithium cobalt composite oxide particle comprises one or two or more selected from Ca, Mg, Sr, Zr and Al as the M elements.

Then, the present invention (5) provides the positive electrode active substance for a lithium secondary battery according to (3), wherein the titanium-containing lithium cobalt composite oxide particle comprises Mg, Sr, Zr and Al as the M elements.

Then, the present invention (6) provides the positive electrode active substance for a lithium secondary battery according to any one of (1) to (5), wherein the content of the inorganic fluoride particle is, in terms of F atoms, 0.05 to 2.0% by mol with respect to Co atoms in the titanium-containing lithium cobalt composite oxide particle.

Then, the present invention (7) provides the positive electrode active substance for a lithium secondary battery according to any one of (1) to (6), wherein the inorganic fluoride particle comprises $MgF_2$ and/or $AlF_3$.

Then, the present invention (8) provides a method for producing a positive electrode active substance for a lithium secondary battery, the method comprising a first step of subjecting a titanium-containing lithium cobalt composite oxide particle and an inorganic fluoride particle to a mixing treatment to thereby obtain a mixture of the titanium-containing lithium cobalt composite oxide particle and the inorganic fluoride particle.

Then, the present invention (9) provides the method for producing a positive electrode active substance for a lithium secondary battery according to (8), wherein the mixing treatment of the first step is carried out by dry mixing.

Then, the present invention (10) provides the method for producing a positive electrode active substance for a lithium secondary battery according to (9), wherein the dry mixing treatment of the first step is carried out in the presence of water.

Then, the present invention (11) provides the method for producing a positive electrode active substance for a lithium secondary battery according to (8), wherein the mixing treatment of the first step is carried out by wet mixing.

Then, the present invention (12) provides the method for producing a positive electrode active substance for a lithium secondary battery according to any one of (8) to (11), the method further comprising a second step of subjecting the mixture of the titanium-containing lithium cobalt composite oxide particle and the inorganic fluoride particle obtained by carrying out the first step to a heat treatment.

Then, the present invention (13) provides the method for producing a positive electrode active substance for a lithium secondary battery according to (12), wherein the temperature of the heat treatment in the second step is 200 to 1,100° C.

Then, the present invention (14) provides the method for producing a positive electrode active substance for a lithium secondary battery according to any one of (8) to (13), wherein the titanium-containing lithium cobalt composite oxide particle comprises one or two or more selected from the group consisting of Ca, Mg, Sr, Zr, Al, Nb, B and W (M elements).

Then, the present invention (15) provides a lithium secondary battery, comprising, as a positive electrode active substance, a positive electrode active substance for a lithium secondary battery according to any one of (1) to (7).

Advantageous Effects of Invention

According to the present invention, a positive electrode active substance for a lithium secondary battery which is excellent in cycle characteristics, is small in the drop of the average operation voltage, maintains the average operation voltage high, and can make the energy density retention rate high, an industrially advantageous method for producing the same, and a lithium secondary battery having excellent cycle characteristics and average operation voltage characteristic and a high energy density retention rate can be provided.

DESCRIPTION OF EMBODIMENTS

Hereinafter, the present invention will be described based on preferred embodiments.

The positive electrode active substance for a lithium secondary battery of the present invention is a positive electrode active substance for a lithium secondary battery comprising a mixture of a titanium-containing lithium cobalt composite oxide particle and an inorganic fluoride particle.

A titanium-containing lithium cobalt composite oxide forming the titanium-containing lithium cobalt composite oxide particle relevant to the positive electrode active substance for a lithium secondary battery of the present invention is a composite oxide containing, at least, lithium, cobalt and titanium, and is a lithium cobalt composite oxide containing titanium as an additive element. By making a lithium cobalt composite oxide to contain titanium, the characteristic of the average operation voltage is raised.

In the titanium-containing lithium cobalt composite oxide, the molar ratio (Li/Co) of Li to Co in terms of atoms is preferably 0.90 to 1.20 and especially preferably 0.95 to 1.15. By making the molar ratio (Li/Co) of Li to Co in terms of atoms in the titanium-containing lithium cobalt composite oxide to be in the above range, the energy density of the positive electrode active substance for a lithium secondary battery is raised.

In the titanium-containing lithium cobalt composite oxide, the % by mol ((Ti/Co)×100) of Ti to Co in terms of atoms is preferably 0.05 to 2.0% by mol and especially preferably 0.1 to 1.5% by mol. By making the % by mol ((Li/Co)×100) of Li to Co in terms of atoms in the titanium-containing lithium cobalt composite oxide to be in the above range, the characteristic of the average operation voltage is raised.

Depending on a method for producing the titanium-containing lithium cobalt composite oxide, Ti is present only in the interior of a composite oxide particle in some cases, or present in the interior and on the surface of the composite oxide particle in some cases; and in the present invention, Ti may be present in the interior of the composite oxide particle or may be present on the surface of the composite oxide particle. Then in the positive electrode active substance for a lithium secondary battery of the present invention, it is preferable that in the titanium-containing lithium cobalt composite oxide particle, Ti is present at least in the interior of the composite oxide particle so as to form a solid solution, in terms that the structure of the composite oxide is stabilized. Here, Ti being present at least in the interior of the composite oxide particle so as to form a solid solution refers to the case where Ti is present only in the interior of the particle, and also the case where Ti is present both in the interior and on the surface of the particle.

The titanium-containing lithium cobalt composite oxide, though containing Ti as an essential additive element of the lithium cobalt composite oxide, can further contain one or two or more of M elements indicated below, as required, for the purpose of improving the performance or physical properties. The M elements which the titanium-containing lithium cobalt composite oxide contains as required are Ca, Mg, Sr, Zr, Al, Nb, B and W.

The titanium-containing lithium cobalt composite oxide preferably contains Ca and/or Sr as the M elements, and especially preferably contains Ca and/or Sr, and one or more selected from Mg, Zr, Al, Nb, B and W, in terms that the battery characteristics are more enhanced. The titanium-containing lithium cobalt composite oxide particle preferably contains, as the M elements, at least one or two or more selected from Ca, Mg, Sr, Zr and Al. Further the titanium-containing lithium cobalt composite oxide particle preferably contains Mg, Sr, Zr and Al as the M elements.

When the titanium-containing lithium cobalt composite oxide contains an M element, the % by mol ((M/Co)×100) of the M element to Co atoms in terms of atoms is preferably 0.01 to 3.0% by mol and especially preferably 0.05 to 2.0% by mol in the titanium-containing lithium cobalt composite oxide. When the titanium-containing lithium cobalt composite oxide contains an M element, the battery characteristics can be improved without impairing the charge and discharge capacities by making the % by mol ((M/Co)×100) of the M element to Co atoms in terms of atoms in the titanium-containing lithium cobalt composite oxide to be in the above range. Here, when the titanium-containing lithium cobalt composite oxide contains two or more of M elements, the molar number of the M elements in terms of atoms, which becomes the basis of the calculation of the % by mol, refers to the total of molar numbers of the M elements.

Then, when the titanium-containing lithium cobalt composite oxide contains, as M elements, two or more selected from the group consisting of Ca, Mg, Sr, Zr, Al, Nb, B and W, the % by mol ((M/Co)×100) of the M elements to Co atoms in terms of atoms in the titanium-containing lithium cobalt composite oxide is preferably 0.01 to 2.0% by mol and especially preferably 0.05 to 1.0% by mol. When the titanium-containing lithium cobalt composite oxide contains, as M elements, two or more selected from the group consisting of Ca, Mg, Sr, Zr, Al, Nb, B and W, the battery characteristics such as the cycle characteristics, the load characteristics and the safety can be satisfied simultaneously by making the % by mol ((M/Co)×100) of the M elements to Co atoms in terms of atoms in the titanium-containing lithium cobalt composite oxide to be in the above range.

When the titanium-containing lithium cobalt composite oxide contains Ca as an M element, the % by mol ((Ca/Co)×100) of Ca to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains Mg as an M element, the % by mol ((Mg/Co)×100) of Mg to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains Sr as an M element, the % by mol ((Sr/Co)×100) of Sr to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains Zr as an M element, the % by mol ((Zr/Co)×100) of Zr to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains Al as an M element, the % by mol ((Al/Co)×100) of Al to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains Nb as an M element, the % by mol ((Nb/Co)×100) of Nb to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains B as an M element, the % by mol ((B/Co)×100) of B to Co atoms in terms of atoms in the titanium-containing lithium cobalt composite oxide is preferably 0.01 to 2.0% by mol and especially preferably 0.05 to 1.0% by mol.

When the titanium-containing lithium cobalt composite oxide contains W as an M element, the % by mol ((W/Co)×100) of W to Co atoms in terms of atoms in the titanium-containing lithium cobalt composite oxide is preferably 0.01 to 2.0% by mol and especially preferably 0.05 to 1.0% by mol.

The M element may be present in the interior of the titanium-containing lithium cobalt composite oxide particle, may be present on the surface of the titanium-containing lithium cobalt composite oxide particle, or may be present both in the particle interior of and on the particle surface of the titanium-containing lithium cobalt composite oxide particle.

When the M element is present on the particle surface of the titanium-containing lithium cobalt composite oxide, the M element may also be present in the form of an oxide, a composite oxide, a sulfate salt, a phosphate salt or the like.

Then, the titanium-containing lithium cobalt composite oxide particle is a particulate material of the titanium-containing lithium cobalt composite oxide. The average particle diameter of the titanium-containing lithium cobalt composite oxide particle is, in terms of the particle diameter (D50) at a cumulative volume of 50% in a particle size distribution determined by a laser diffraction scattering method, preferably 0.5 to 30 μm and especially preferably 3 to 25 μm. Then, the BET specific surface area of the titanium-containing lithium cobalt composite oxide particle is preferably 0.05 to 1.0 m$^2$/g and especially preferably 0.15 to 0.6 m$^2$/g. By making the average particle diameter and the BET specific surface area of the titanium-containing lithium cobalt composite oxide particle to be in the above ranges, the preparation and the coatability of a positive electrode mixture become easy and an electrode having high packing property can be obtained.

The titanium-containing lithium cobalt composite oxide particle is produced, for example, by carrying out a raw material mixing step of preparing a raw material mixture containing a lithium compound, a cobalt compound and a titanium compound, and then a firing step of firing the obtained raw material mixture.

The lithium compound relevant to the raw material mixing step is not especially limited as long as being a lithium compound usually used as a raw material for production of lithium cobalt composite oxides, and includes an oxide, a hydroxide, a carbonate salt, a nitrate salt, a sulfate salt and organic acid salts of lithium.

The cobalt compound relevant to the raw material mixing step is not especially limited as long as being a cobalt compound usually used as a raw material for production of lithium cobalt-based composite oxides, and includes an oxide, an oxyhydroxide, a hydroxide, a carbonate salt, a nitrate salt, a sulfate salt and organic acid salts of cobalt.

The titanium compound relevant to the raw material mixing step is not especially limited as long as being a titanium compound usually used as a raw material for production of lithium cobalt composite oxides to which titanium element is added, and includes an oxide, a hydroxide, a carbonate salt, a nitrate salt, a sulfate salt and organic acid salts of titanium. Among these, as the titanium compound, titanium dioxide is preferable.

In the raw material mixing step, the mixing proportion of the lithium compound and the cobalt compound, in the molar ratio (Li/Co mixing molar ratio) of lithium atoms to the molar number of cobalt atoms, is preferably 0.90 to 1.20 and especially preferably 0.95 to 1.15. By making the mixing proportion of the lithium compound and the cobalt compound to be in the above range, it becomes easy for a single phase of a lithium cobalt composite oxide containing titanium to be obtained.

In the raw material mixing step, the mixing proportion of the titanium compound, in terms of titanium atoms with respect to cobalt atoms, is preferably 0.05 to 2.0% by mol and especially preferably 0.1 to 1.5% by mol. By making the mixing proportion of the titanium compound to be in the above range, the effect of improving the performance including the cycle characteristics, the average operation voltage characteristic and the energy density retention rate is enhanced without impairing the charge and discharge capacities intrinsic to the lithium cobalt composite oxide.

In the raw material mixing step, the raw material mixture can be mixed with a compound containing an M element.

The compound containing an M element includes oxides, hydroxides, carbonate salts, nitrate salts and organic acid salts containing the M element. As the compound containing an M element, a compound containing two or more kinds of M element may be used, and a compound containing a Ti element and an M element, such as strontium titanate, may be used.

It is preferred for the cobalt compound, the compound containing Ti and the compound containing the M element as raw materials to have an impurity content as low as possible, though regardless of the production history, in order to produce a high-purity titanium-containing lithium cobalt composite oxide particle.

In the raw material mixing step, examples of a method of mixing the lithium compound, the cobalt compound, the titanium compound, and the compound containing an M element to be used as required include mixing methods using a ribbon mixer, a Henschel mixer, a Supermixer, a Nauta mixer or the like. Then, for a mixing method on a laboratory level, a household mixer suffices.

The firing step is a step of firing the raw material mixture obtained by carrying out the raw material mixing step to thereby obtain the titanium-containing lithium cobalt composite oxide.

In the firing step, the firing temperature when the raw material mixture is fired to react the raw materials is 800 to 1,150° C. and preferably 900 to 1,100° C. By making the firing temperature to be the above range, the formation of an unreacted cobalt oxide or superheated decomposition products of the lithium cobalt composite oxide, which causes the capacity reduction of the titanium-containing lithium cobalt composite oxide can be reduced.

The firing time in the firing step is 1 to 30 hours and preferably 5 to 20 hours. The firing atmosphere in the firing step is an oxidative atmosphere such as air or oxygen gas.

The titanium-containing lithium cobalt composite oxide thus obtained may be subjected to firing steps of a plurality of times, as required.

The inorganic fluoride particle relevant to the positive electrode active substance for a lithium secondary battery of the present invention is insoluble or poorly soluble in water. Examples of the inorganic fluoride include $MgF_2$, $AlF_3$, $TiF_4$, $ZrF_4$, $CaF_2$, $BaF_2$, $SrF_2$, $ZnF_2$ and $LiF$. The inorganic fluoride particle is preferably $MgF_2$ and/or $AlF_3$. The inorganic fluoride particle may be used singly or in combinations of two or more.

The inorganic fluoride particle is a particulate inorganic fluoride. The average particle diameter of the inorganic fluoride particle, in terms of the average particle diameter determined by a laser diffraction scattering method, is preferably 0.01 to 30 μm and especially preferably 0.1 to 20 μm. By making the average particle diameter of the inorganic fluoride particle to be in the above range, disadvantage hardly occurs in a kneading step in preparation of a positive electrode mixture and in a coating step of coating the obtained positive electrode mixture on a positive electrode current collector.

The content of the inorganic fluoride particle, in terms of F atoms with respect to Co atoms in the titanium-containing lithium cobalt composite oxide particle, is preferably 0.05 to 5.0% by mol and especially preferably 0.1 to 2.0% by mol. By making the content of the inorganic fluoride particle to be in the above range, the lowering of the charge and discharge capacities of the titanium-containing lithium cobalt composite oxide is suppressed and simultaneously, the effect of improving the cycle characteristics thereof in high voltages is enhanced. Then, in the case of using two or more kinds of inorganic fluoride particles as the inorganic fluoride particle, for example, in the case of concurrently using $MgF_2$ and $AlF_3$, the total of F atoms of the two or more kinds of inorganic fluoride particles in terms of F atoms is regulated so as to become, with respect to Co atoms in the titanium-containing lithium cobalt composite oxide particle, preferably 0.05 to 5.0% by mol and especially preferably 0.1 to 2.0% by mol. In the case of using two or more kinds of inorganic fluoride particles as the inorganic fluoride particle, by making the total content of F atoms of the two or more kinds of inorganic fluoride particles in terms of F atoms to be in the above range, the lowering of the charge and discharge capacities of the titanium-containing lithium cobalt composite oxide is suppressed, and the effect of improving the cycle characteristics in high voltages, the characteristic of the average operation voltage, the characteristic of the energy density retention rate, and the like is simultaneously enhanced.

In the positive electrode active substance for a lithium secondary battery of the present invention, the inorganic fluoride particle may be present on the particle surface of the titanium-containing lithium cobalt composite oxide particle, or may be present in a simple state of being mixed with the titanium-containing lithium cobalt composite oxide particle, or may be present in both states. That is, the positive electrode active substance for a lithium secondary battery of the present invention may be one composed of the titanium-containing lithium cobalt composite oxide particle and the inorganic fluoride particle present on the surface of the titanium-containing lithium cobalt composite oxide particle, or may be a simple mixture of the titanium-containing lithium cobalt composite oxide particle and the inorganic fluoride particle, or may be a mixture in both the forms. Here, when the inorganic fluoride particle is present on the particle surface of the titanium-containing lithium cobalt composite oxide particle, it is preferable that the inorganic fluoride particle is present partially on the surface of the titanium-containing lithium cobalt composite oxide particle, in terms that the intercalation and deintercalation of lithium through the surface of the titanium-containing lithium cobalt composite oxide particle is not inhibited.

The positive electrode active substance for a lithium secondary battery of the present invention is suitably produced by a production method comprising a first step of subjecting a titanium-containing lithium cobalt composite oxide particle and an inorganic fluoride particle indicated below in predetermined amounts to a mixing treatment.

The method for producing the positive electrode active substance for a lithium secondary battery of the present invention comprises the first step of subjecting a titanium-containing lithium cobalt composite oxide particle and an inorganic fluoride particle to a mixing treatment to thereby obtain a mixture of the titanium-containing lithium cobalt composite oxide particle and the inorganic fluoride particle.

The titanium-containing lithium cobalt composite oxide particle relevant to the first step is the same as the titanium-containing lithium cobalt composite oxide particle relevant to the positive electrode active substance for a lithium secondary battery of the present invention. That is, the titanium-containing lithium cobalt composite oxide relevant to the first step is a composite oxide comprising lithium, cobalt and titanium, or a composite oxide comprising lithium, cobalt, titanium and one or two or more of the M elements. The inorganic fluoride particle relevant to the first step is the same as the inorganic fluoride particle relevant to the positive electrode active substance for a lithium secondary battery of the present invention.

In the first step, the mixing treatment can be carried out by either of dry mixing and wet mixing.

In the first step, carrying out by mechanical means is preferable in that a homogeneous mixture can be obtained as a method of carrying out the dry mixing treatment. An apparatus to be used for the dry mixing is not especially limited as long as providing a homogeneous mixture, but examples thereof include a high-speed mixer, a Supermixer, a Turbo Sphere mixer, an Eirich mixer, a Henschel mixer, a Nauta mixer, a ribbon blender, a V-type mixer, a conical blender, a jet mill, a Cosmomizer, a paint shaker, a bead mill and a ball mill. Then, as a mixing apparatus on a laboratory level, a household mixer suffices.

When the mixing treatment is carried out by dry mixing in the first step, the dry mixing treatment can be carried out in the presence of a small amount of water. By carrying out the dry mixing treatment in the presence of a small amount of water, it becomes easy for the mixing state of the titanium-containing lithium cobalt composite oxide particle and the inorganic fluoride particle to become homogeneous as compared with the case of carrying out the dry mixing treatment in the complete absent of water. In the first step, however, when the dry mixing treatment is carried out in the presence of a small amount of water, it is preferable that the mixture is dried after the mixing treatment, and the obtained mixture is subjected to a second step of carrying out a heat treatment to thereby sufficiently remove moisture, in terms that the deterioration of characteristics such as the lowering of the charge and discharge capacities and the decline of the cycle characteristics hardly occur.

When the dry mixing treatment is carried out in the presence of a small amount of water in the first step, the amount of water to be added, with respect to the mixture of the titanium-containing lithium cobalt composite oxide particle and the inorganic fluoride particle, is preferably 1 to 10% by mass and especially preferably 2 to 5% by mass.

When the dry mixing treatment is carried out in the presence of water in the first step, it is preferable that after the mixing treatment, the mixture is dried at 80 to 200° C., and then, the obtained mixture is subjected to the second step of carrying out a heat treatment.

In the first step, a method of carrying out a wet mixing treatment includes a method in which the titanium-containing lithium cobalt composite oxide particle and the inorganic fluoride particle are added to a water solvent so that the solid content becomes 10 to 80% by mass, preferably 20 to 70% by mass; the mixture is mixed by mechanical means to prepare a slurry; and the slurry is dried in a state of being left still, or dried by subjecting the slurry to spray drying treatment to thereby obtain a mixture of the lithium cobalt composite oxide particle and the inorganic fluoride particle.

An apparatus to be used for the wet mixing is not especially limited as long as providing a homogeneous slurry, but examples thereof include apparatuses such as a stirrer, a mixer using a stirring blade, a three-roll mill, a ball mill, a Desper mill, a homogenizer, a vibration mill, a sand grind mill, an attritor and an intensive mixer. The wet mixing treatment is not limited to a mixing treatment using mechanical means exemplified above. In the wet mixing, the mixing treatment may be carried out by adding a surfactant to the slurry.

In the first step, when the dry mixing treatment is carried out in the presence of a small amount of water or when the wet mixing treatment is carried out, it is preferable that successively to the first step, the second step is carried out, in terms that the deterioration of characteristics such as the lowering of the charge and discharge capacities and the decline of the cycle characteristics to be caused due to moisture hardly occur.

In the second step, the mixture of the titanium-containing lithium cobalt composite oxide particle and the inorganic fluoride particle obtained by carrying out the first step is subjected to the heat treatment. The temperature of the heat treatment in the second step is preferably 200 to 1,100° C. and especially preferably 500 to 1,000° C. By making the temperature of the heat treatment to be in the above range, moisture can sufficiently be removed and the deterioration of characteristics such as the lowering of the charge and discharge capacities and the decline of the cycle characteristics hardly occur. The time of the heat treatment in the second step is preferably 1 to 10 hours and especially preferably 2 to 7 hours. Then, the atmosphere of the heat treatment in the second step is preferably an oxidative atmosphere such as air or oxygen gas.

The lithium secondary battery of the present invention uses, as a positive electrode active substance, the positive electrode active substance for a lithium secondary battery of the present invention. The lithium secondary battery of the present invention is composed of a positive electrode, a negative electrode, a separator and a nonaqueous electrolyte containing a lithium salt.

The positive electrode relevant to the lithium secondary battery of the present invention is formed, for example, by applying and drying a positive electrode mixture on a positive electrode current collector. The positive electrode mixture is composed of the positive electrode active substance, a conductive agent, a binder and as required, a filler and the like to be added. In the lithium secondary battery of the present invention, the positive electrode has the positive electrode active substance for a lithium secondary battery of the present invention uniformly applied thereon. Hence, the lithium secondary battery of the present invention is high in the battery performance, and especially excellent in the cycle characteristics, small in the drop of the average operation voltage, maintaining the average operation voltage high, and further is high in the energy density retention rate.

The content of the positive electrode active substance contained in the positive electrode mixture relevant to the lithium secondary battery of the present invention is 70 to 100% by mass and preferably 90 to 98% by mass.

The positive electrode current collector relevant to the lithium secondary battery of the present invention is not especially limited as long as being an electron conductor causing no chemical change in a constituted battery, but examples thereof include stainless steels, nickel, aluminum, titanium, burned carbon, and aluminum and stainless steels whose surface has been surface treated with carbon, nickel, titanium or silver. These may be used by oxidizing the surface thereof, or may also be used by imparting roughness to the current collector surface by a surface treatment. Examples of the form of the current collector include foils, films, sheets, nets, punched materials, laths, porous materials, foams, and formed bodies of fibers or nonwoven fabrics. The thickness of the current collector is not especially limited, but is preferably made to be 1 to 500 µm.

The conductive agent relevant to the lithium secondary battery of the present invention is not especially limited as long as being an electron conducting material causing no chemical change in a constituted battery. Examples thereof include graphites such as natural graphite and artificial graphite, carbon blacks such as carbon black, acetylene black, Ketjen black, channel black, furnace black, lamp black and thermal black, conductive fibers such as carbon fibers and metal fibers, metal powders such as powders of carbon fluoride, aluminum, nickel or the like, conductive whiskers such as whiskers of zinc oxide, potassium titanate or the like, conductive metal oxides such as titanium oxide, and conductive materials such as polyphenylene derivatives; examples of the natural graphite include vein graphite, flake graphite and amorphous graphite. These can be used singly or in a combination of two or more. The blend ratio of the conductive agent is, in the positive electrode mixture, 1 to 50% by mass and preferably 2 to 30% by mass.

Examples of the binder relevant to the lithium secondary battery of the present invention include starch, polyvinylidene fluoride, polyvinyl alcohol, carboxymethylcellulose, hydroxypropylcellulose, regenerated cellulose, diacetylcellulose, polyvinylpyrrolidone, tetrafluoroethylene, polyethylene, polypropylene, ethylene-propylene diene terpolymer (EPDM), sulfonated EPDM, styrene butadiene rubber, fluororubber, tetrafluoroethylene-hexafluoroethylene copolymers, tetrafluoroethylene-hexafluoropropylene copolymers, tetrafluoroethylene-perfluoroalkyl vinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers or ($Na^+$) ion-crosslinked materials thereof, ethylene-methacrylic acid copolymers or ($Na^+$) ion-crosslinked materials thereof, ethylene-methyl acrylate copolymers or ($Na^+$) ion-crosslinked materials thereof, ethylene-methyl methacrylate copolymers or ($Na^+$) ion-crosslinked materials thereof, polysaccharides of polyethylene oxide or the like, thermoplastic resins, and polymers having rubber elasticity; and these can be used singly or in a combination of two or more. Here, when a compound is used which contains a functional group reactive with lithium, like polysaccharides, it is preferable that a compound having, for example, an isocyanate group is added to deactivate the functional group. The blend ratio of the binder is, in the positive electrode mixture, 1 to 50% by mass and preferably 5 to 15% by mass.

The filler relevant to the lithium secondary battery of the present invention is a material to suppress the volume expansion and the like of the electrode in the positive electrode mixture, and is added as required. As the filler, any filler can be used as long as being a fibrous material causing no chemical change in a constituted battery, but fibers, for example, fibers of olefinic polymers such as polypropylene and polyethylene, glass, and carbon are used. The amount of the filler to be added is not especially limited, but is preferably 0 to 30% by mass in the positive electrode mixture.

The negative electrode relevant to the lithium secondary battery of the present invention is formed by applying and drying a negative electrode material on a negative electrode current collector. The negative electrode current collector relevant to the lithium secondary battery of the present invention is not especially limited as long as being an electron conductor causing no chemical change in a constituted battery, but examples thereof include stainless steels, nickel, copper, titanium, aluminum, burned carbon, and copper and stainless steels whose surface has been surface treated with carbon, nickel, titanium or silver, and aluminum-cadmium alloys. These may be used by oxidizing the surface thereof, or may also be used by imparting roughness to the current collector surface by a surface treatment. Examples of the form of the current collector include foils, films, sheets, nets, punched materials, laths, porous materials, foams, and formed bodies of fibers or nonwoven fabrics. The thickness of the current collector is not especially limited, but is preferably made to be 1 to 500 µm.

The negative electrode material relevant to the lithium secondary battery of the present invention is not especially limited, but examples thereof include carbonaceous materials, metal composite oxides, lithium metal, lithium alloys, silicon-based alloys, tin-based alloys, metal oxides, conductive polymers, chalcogen compounds, Li—Co—Ni-based alloys, $Li_4Ti_5O_{12}$, lithium niobate, and silicon oxide ($SiO_x$: $0.5 \leq x \leq 1.6$). Examples of the carbonaceous materials include non-graphitizable carbon materials and graphite-based carbon materials. Examples of the metal composite oxides include compounds such as $Sn_p(M^1)_{1-p}(M^2)_qO_r$ (wherein $M^1$ is one or more elements selected from Mn, Fe, Pb and Ge; $M^2$ is one or more elements selected from Al, B, P, Si, periodic table group 1, group 2 and group 3 elements and halogen elements; and $0<p\leq1$, $1\leq q\leq3$ and $1\leq r\leq8$), $Li_xFe_2O_3$ ($0\leq t\leq1$) and $Li_tWO_2$ ($0\leq t\leq1$). The metal oxides include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$ and $Bi_2O_5$. The conductive polymers include polyacetylene and poly-p-phenylene.

As the separator relevant to the lithium secondary battery of the present invention, there is used an insulating thin film having a high ion permeability and having a predetermined mechanical strength. There is used a sheet or a nonwoven fabric composed of an olefinic polymer such as polypropylene, or glass fibers, or polyethylene, or the like from the viewpoint of the organic solvent resistance and the hydrophobicity. The pore diameter of the separator suffices if being in the range useful as pores for batteries, and is, for example, 0.01 to 10 µm. The thickness of the separator suffices if being in the range for usual batteries, and is, for example, 5 to 300 µm. Then, when a solid electrolyte such as a polymer is used as an electrolyte described later, the solid electrolyte may serve also as a separator.

The nonaqueous electrolyte containing a lithium salt relevant to the lithium secondary battery of the present invention is composed of a nonaqueous electrolyte and the lithium salt. As the nonaqueous electrolyte relevant to the present invention, a nonaqueous electrolyte solution, an organic solid electrolyte or an inorganic solid electrolyte is used. Examples of the nonaqueous electrolyte solution include one of or mixed solvents of two or more of aprotic organic solvents such as N-methyl-2-pyrroridinone, propylene carbonate, ethylene carbonate, butylene carbonate, dimethyl carbonate, diethyl carbonate, γ-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triesters, trimetoxymethane, dioxolane derivatives, sulfolane, methyl sulfolane, 3-methyl-2-oxazolidinone, 1,3-dimethyl-2-imidazolidinone, propylene carbonate derivatives, tetrahydrofuran derivatives, diethyl ether, 1,3-propanesultone, methyl propionate and ethyl propionate.

Examples of the organic solid electrolyte relevant to the lithium secondary battery of the present invention include: polymers containing ionic dissociation groups of polyethylene derivatives, polyethylene oxide derivatives or polymers containing these, polypropylene oxide derivatives or polymers containing these, phosphate ester polymers, polyphosphazene, polyaziridine, polyethylene sulfide, polyvinyl alcohol, polyvinylidene fluoride, polyhexafluoropropylene, and the like; and mixtures of the polymer containing ionic dissociation groups and the above-mentioned nonaqueous electrolyte solution.

As the inorganic solid electrolyte relevant to the lithium secondary battery of the present invention, there can be used a nitride, a halide, an oxygen acid salt, a sulfide or the like of Li; and examples thereof include $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $P_2S_5$, $Li_2S$ or $Li_2S$—$P_2S_5$, $Li_2S$—$SiS_2$, $Li_2S$—$GeS_2$, $Li_2S$—$Ga_2S_3$, $Li_2S$—$B_2S_3$, $Li_2S$—$P_2S_5$—X, $Li_2S$—$SiS_2$—X, $Li_2S$—$GeS_2$—X, $Li_2S$—$Ga_2S_3$—X, $Li_2S$—$B_2S_3$—X, (wherein X is at least one or more selected from $LiI$, $B_2S_3$ and $Al_2S_3$).

Further when the inorganic solid electrolyte is an amorphous material (glass), the inorganic solid electrolyte can be made to contain a compound containing oxygen, such as Lithium phosphate ($Li_3PO_4$), lithium oxide ($Li_2O$), lithium sulfate ($Li_2SO_4$), phosphorus oxide ($P_2O_5$) or lithium borate ($Li_3BO_3$), or a compound containing nitrogen, such as $Li_3PO_{4-u}N_{2u/3}$ (u is 0<u<4), $Li_4SiO_{4-u}N_{2u/3}$ (u is 0<u<4), $Li_4GeO_{4-u}N_{2u/3}$ (u is 0<u<4) or $Li_3BO_{3-u}N_{2u/3}$ (u is 0<u<3). The addition of the compound containing oxygen or the compound containing nitrogen leads to expansion of interstices in an amorphous skeleton formed, whereby the hindrance to lithium ion migration can be reduced, and further the ionic conductivity can be improved.

As the lithium salt relevant to the lithium secondary battery of the present invention, those dissolving in the above nonaqueous electrolyte are used, and examples thereof include one of or mixed salts of two or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiB_{10}Cl_{10}$, $LiAlCl_4$, $CH_3SO_3Li$, $CF_3SO_3Li$, $(CF_3SO_2)_2NLi$, chloroborane lithium, lithium lower aliphatic carboxylates, lithium tetraphenylborate, and imides.

Then, to the nonaqueous electrolyte, compounds indicated below can be added for the purpose of improving charge and discharge characteristics and the flame retardancy. Examples thereof include pyridine, triethyl phosphite, triethanolamine, cyclic ethers, ethylenediamine, n-glyme, triamide hexaphosphate, nitrobenzene derivatives, sulfur, quinoneimine dyes, N-substituted oxazolidinone, N,N-substituted imidazolidine, ethylene glycol dialkyl ethers, ammonium salts, polyethylene glycol, pyrrole, 2-methoxyethanol, aluminum trichloride, monomers of conductive polymeric electrode active substances, triethylene phosphonamide, trialkyl phosphines, morpholine, aryl compounds having a carbonyl group, hexamethylphosphoric triamide, 4-alkylmorpholines, dicyclic tertiary amines, oils, phosphonium salts, tertiary sulfonium salts, phosphazene and carbonate esters. Further in order to make the electrolyte solution to be nonflammable, the electrolyte solution can be made to contain a halogen-containing solvent, for example, carbon tetrachloride or ethylene trifluoride. Further in order to make the electrolyte solution to have suitability for high-temperature storage, the electrolyte solution can be made to contain carbon dioxide gas.

The lithium secondary battery of the present invention is a lithium secondary battery high in the capacity per volume, and excellent also in the safety, the cycle characteristics and the operation voltage; and the shape of the battery may be any of a button shape, a sheet shape, a cylinder shape, a square shape, a coin shape and the like.

Applications of the lithium secondary battery of the present invention are not especially limited, but examples thereof include electronic devices such as notebook personal computers, laptop personal computers, pocket word processors, mobile phones, cordless slave units, portable CD players, radios, liquid crystal televisions, backup power sources, electric shavers, memory cards and video movies, and consumer electronic devices for automobiles, motorized vehicles, game machines, electric power tools and the like.

EXAMPLES

Hereinafter, the present invention will be described in more detail by way of Examples, but the present invention is not any more limited to these Examples.

<Preparation of Lithium Cobalt Composite Oxide Particles (LCO)>

<LCO Particle 1a>

Lithium carbonate (average particle diameter: 5.7 μm), tricobalt tetraoxide (average particle diameter: 2.5 μm), titanium dioxide (average particle diameter: 0.4 μm) and calcium sulfate (average particle diameter: 7.3 μm) were weighed and fully mixed by a household mixer to thereby obtain a raw material mixture in which the molar ratio of Li/Co was 1.04; Ti/Co, 0.01; and Ca/Co, 0.0006.

Then, the obtained raw material mixture was fired at 1,050° C. for 5 hours in the air in an alumina bowl. After the finish of the firing, the fired product was crushed and classified to thereby obtain a lithium cobalt composite oxide particle containing 1.0% by mol of Ti and 0.06% by mol of Ca with respect to Co.

<LCO Particle 1b>

Lithium carbonate (average particle diameter: 5.7 μm), tricobalt tetraoxide (average particle diameter: 3.3 μm), titanium dioxide (average particle diameter: 0.4 μm) and calcium sulfate (average particle diameter: 7.3 μm) were weighed and fully mixed by a household mixer to thereby obtain a raw material mixture in which the molar ratio of Li/Co was 1.04; Ti/Co, 0.01; and Ca/Co, 0.0006.

Then, the obtained raw material mixture was fired at 1,050° C. for 5 hours in the air in an alumina bowl. After the finish of the firing, the fired product was crushed and classified to thereby obtain a lithium cobalt composite oxide particle containing 1.0% by mol of Ti and 0.06% by mol of Ca with respect to Co.

<LCO Particle 2>

Lithium carbonate (average particle diameter: 5.7 μm), tricobalt tetraoxide (average particle diameter: 25.0 μm), titanium dioxide (average particle diameter: 0.4 μm), magnesium oxide (average particle diameter: 2.6 μm), strontium titanate (average particle diameter: 0.4 μm), zirconium oxide (average particle diameter: 0.8 μm) and aluminum hydroxide (average particle diameter: 1.0 μm) were weighed and fully mixed by a household mixer to thereby obtain a raw material mixture in which the molar ratio of Li/Co was 1.05; Ti/Co, 0.00175; Sr/Co, 0.00125; Mg/Co, 0.00125; Zr/Co, 0.00125; and Al/Co, 0.008.

Then, the obtained raw material mixture was fired at 1,080° C. for 5 hours in the air in an alumina bowl. After the finish of the firing, the fired product was crushed and classified to thereby obtain a lithium cobalt composite oxide particle containing, with respect to Co, 0.175% by mol of Ti, 0.125% by mol of Mg, 0.125% by mol of Sr, 0.125% by mol of Zr and 0.8% by mol of Al.

Physical properties of the lithium cobalt composite oxide samples (LCO samples) obtained in the above are shown in Table 1. Here, the average particle diameter was determined by a laser diffraction scattering method.

TABLE 1

| LCO Particle | Li/Co Feeding Ratio | % by mol of Ti and M Elements with respect to Co | Average Particle Diameter (μm) | BET Specific Stuface Area. (m²/g) |
|---|---|---|---|---|
| Particle 1a | 1.04 | Ti:1.0 Ca:0.06 | 8.5 | 0.44 |
| Particle 1b | 1.04 | Ti:1.0 Ca:0.06 | 8.4 | 0.39 |
| Particle 2 | 1.05 | Ti:0.175 Sr:0.125 Mg:0.125 Zr:0.125 Al:0.8 | 19.4 | 0.14 |

<Inorganic Fluoride Particles>

As inorganic fluoride particles, there were used inorganic fluoride particles made by crushing commercially available inorganic fluorides and having a physical property shown in the following Table 2.

TABLE 2

| Physical Property of Inorganic Fluoride Particle | |
|---|---|
| Sample | Average Particle Diameter (μ) |
| $MgF_2$ | 2.8 |
| $AlF_3$ | 3.3 |

Examples 1 to 9

In each Example, the LCO particle 1a or 1b described in Table 1 was used, and the LCO particle 1a or 1b and the above $MgF_2$ and $AlF_3$ were weighed so that the amounts of the inorganic fluoride particles added became amounts indicated in a first step of Table 3, and fully mixed by a household mixer.

Then, the mixture was subjected to a heat treatment (at 600° C. for 5 hours) in the air indicated in a second step of Table 3 to thereby prepare a positive electrode active substance sample.

Example 10

The LCO particle 1b described in Table 1 was used, and the LCO particle 1b and the above $MgF_2$ and $AlF_3$ were weighed so that the amounts of the inorganic fluoride particles added became amounts indicated in the first step of Table 3; and water was further added to thereby prepare a 40 mass % slurry; and the slurry was fully stirred and mixed by a stirrer.

Then, the slurry was subjected to a spray drying treatment by a spray drying machine whose exhaust temperature was regulated to 120° C. to thereby obtain a dried powder.

Then, the dried powder was subjected to a heat treatment (at 600° C. for 5 hours) in the air indicated in the second step of Table 3 to thereby prepare a positive electrode active substance sample.

Example 11

The LCO particle 2 described in Table 1 was used, and the LCO particle 2 and the above $MgF_2$ and $AlF_3$ were weighed so that the amounts of the inorganic fluoride particles added became amounts indicated in the first step of Table 3, and fully mixed by a household mixer.

Then, the mixture was subjected to a heat treatment (at 600° C. for 5 hours) in the air indicated in the second step of Table 3 to thereby prepare a positive electrode active substance sample.

Example 12

The LCO particle 2 described in Table 1 was used, and the LCO particle 2 and the above $MgF_2$ and $AlF_3$ were weighed so that the amounts of the inorganic fluoride particles added became amounts indicated in the first step of Table 3; and water was further added to thereby prepare a 32 mass % slurry; and the slurry was fully stirred and mixed by a stirrer.

Then, the slurry was subjected to a spray drying treatment by a spray drying machine whose exhaust temperature was regulated to 120° C. to thereby obtain a dried powder.

Then, the dried powder was subjected to a heat treatment (at 600° C. for 5 hours) in the air indicated in the second step of Table 3 to thereby prepare a positive electrode active substance sample.

Comparative Examples 1 to 3

In each Comparative Example, the LCO particle 1a, 1b or 2 described in Table 1 was used, and only a heat treatment indicated in the second step of Table 3 was carried out to thereby make a positive electrode active substance sample. That is, in Comparative Examples 1 to 3, no inorganic fluoride particle was mixed.

TABLE 3

| | First Step | | | | | Second Step | |
|---|---|---|---|---|---|---|---|
| | LCD Particle | | Inorganic Fluoride Particle | | | Heat Treatment | |
| | Kind | Weight (g) | Kind | Weight Added (g) | Amount Added[1] (% by mol) | Weight of Water Added (g) | Temperature (° C.) | Time (h) |
| Example 1 | Sample 1a | 20 | $MgF_2$ | 0.007 | 0.1 | — | 600 | 5 |
| | | | $AlF_3$ | — | — | | | |
| Example 2 | Sample 1a | 70 | $MgF_2$ | 0.019 | 0.3 | — | 600 | 5 |
| | | | $AlF_3$ | — | — | | | |

TABLE 3-continued

| | First Step | | | | | Second Step | |
|---|---|---|---|---|---|---|---|
| | LCD Particle | | Inorganic Fluoride Particle | | | Heat Treatment | |
| | | | | Amount | Weight of | | |
| | Kind | Weight (g) | Kind | Weight Added (g) | Added[1] (% by mol) | Water Added (g) | Temperature (° C.) | Time (h) |
| Example 3 | Sample 1a | 20 | MgF$_2$ AlF$_3$ | 0.065 — | 1 — | — | 600 | 5 |
| Example 4 | Sample 1a | 20 | MgF$_2$ AlF$_3$ | — 0.009 | — 0.15 | — | 600 | 5 |
| Example 5 | Sample 1a | 70 | MgF$_2$ AlF$_3$ | — 0.017 | — 0.3 | — | 600 | 5 |
| Example 6 | Sample 1a | 20 | MgF$_2$ AlF$_3$ | — 0.087 | — 1.5 | — | 600 | 5 |
| Example 7 | sample 1a | 20 | MgF$_2$ AlF$_3$ | 0.016 0.035 | 0.25 0.6 | — | 600 | 5 |
| Example 8 | Sample 1b | 70 | MgF$_2$ AlF$_3$ | 0.016 0.035 | 0.25 0.6 | — | 600 | 5 |
| Example 9 | Sample 1b | 20 | MgF$_2$ AlF$_3$ | 0.016 0.035 | 0.25 0.6 | — | 200 | 2 |
| Example 10 | Sample 1b | 20 | MgF$_2$ AlF$_3$ | 0.016 0.035 | 0.25 0.6 | 30 | 600 | 5 |
| Example 11 | Sample 2 | 20 | MgF$_2$ AlF$_3$ | 0.016 0.035 | 0.25 0.6 | — | 600 | 5 |
| Example 12 | Sample 7 | 20 | MgF$_2$ AlF$_3$ | 0.016 0.035 | 0.75 0.6 | 42 | 600 | 5 |
| Comparative Example 1 | Sample 1a | 20 | — | — | — | — | 600 | 5 |
| Comparative Example 2 | Sample 1b | 20 | — | — | — | — | 200 | 2 |
| Comparative Example 3 | Sample 2 | 20 | — | — | — | — | 600 | 5 |

1) The amount of an inorganic fluoride particle added was expressed in % by mol in terms of F atoms with respect to Co atoms in a lithium cobalt composite oxide particle.

Battery performance tests were carried out as follows.

<Fabrication of Lithium Secondary Batteries>

95% by mass of the positive electrode active substance obtained in Examples and Comparative Examples each, 2.5% by mass of a graphite powder and 2.5% by mass of a polyvinylidene fluoride were mixed to make a positive electrode mixture, and the mixture was dispersed in N-methyl-2-pyrrolidinone to thereby prepare a kneaded paste. The kneaded paste was applied on an aluminum foil, thereafter dried and pressed and punched out into a disc of 15 mm in diameter to thereby obtain a positive electrode plate.

By using the positive electrode plate, each member of a separator, a negative electrode, a positive electrode, current collectors, mounting metal fittings, external terminals, an electrolyte solution and the like was used to thereby fabricate a coin-type lithium secondary battery. Among these, the negative electrode used was a metal lithium foil, and the electrolyte solution used was one in which 1 mol of LiPF$_6$ was dissolved in 1 L of a mixed solution of ethylene carbonate and methyl ethyl carbonate in 1:1.

Then, performance evaluations for the obtained lithium secondary batteries were carried out. The results are shown in Table 4 to Table 6.

<Performance Evaluations of the Batteries>

The fabricated coin-type lithium secondary batteries were each operated at room temperature under the following test conditions and the following battery performance was evaluated.

(1) Test Condition for Evaluation of the Cycle Characteristics

First, on the battery, there was carried out constant current-constant voltage charge (CCCV charge) in which charge at 0.5 C up to 4.5 V was carried out over 2 hours and the voltage of 4.5 V was held for 3 hours. Thereafter, constant current discharge (CC discharge) at 0.2 C down to 2.7 V was carried out. The operation of these charge and discharge was taken as one cycle, and the discharge capacity was measured at every one cycle. This cycle was repeated 20 times.

(2) First-Cycle Discharge Capacity (Per Active Substance Weight)

The discharge capacity of the first cycle in the evaluation of the cycle characteristics was taken as a first-cycle discharge capacity.

(3) Capacity Retention Rate

The capacity retention rate was calculated by the following expression from the respective discharge capacities (per active substance weight) of the first cycle and the 20th cycle in the evaluation of the cycle characteristics.

Capacity retention rate (%)=(a discharge capacity of the 20th cycle/a discharge capacity of the first cycle)×100

(4) First-Cycle Average Operation Voltage

The average operation voltage in discharge of the first cycle in the evaluation of the cycle characteristics was taken as a first-cycle average operation voltage.

(5) Magnitude of the Average Operation Voltage Drop

The magnitude of the average operation voltage drop (ΔV) was calculated by the following expression from the respective average operation voltages in discharge of the first cycle and the 20th cycle in the evaluation of the cycle characteristics.

Magnitude of the average operation voltage drop (V)=an average operation voltage of the first cycle−an average operation voltage of the 20th cycle (6) Energy Density Retention Rate The energy density retention rate was calculated by the following expression from the respective Wh capacities (per active substance weight) in discharge of the first cycle and the 20th cycle in the evaluation of the cycle characteristics.

Energy density retention rate (%)=(a discharge Wh capacity of the 20th cycle/a discharge Wh capacity of the first cycle)×100

TABLE 4

| | First-Cycle Discharge Capacity (mAh/g) | Capacity Retention Rate (%) | First-Cycle Average Operation Voltage (V) | Magnitude of Average Operation Voltage Drop (V) | Energy Density Retention Rate (%) |
|---|---|---|---|---|---|
| Example 1 | 187 | 89.6 | 4.03 | 0.06 | 88.3 |
| Example 2 | 189 | 89.9 | 4.03 | 0.04 | 89.0 |
| Example 3 | 186 | 90.4 | 4.03 | 0.05 | 89.3 |
| Example 4 | 187 | 90.1 | 4.03 | 0.06 | 88.8 |
| Example 5 | 187 | 90.6 | 4.04 | 0.03 | 89.9 |
| Example 6 | 184 | 92.3 | 4.03 | 0.00 | 92.4 |
| Example 7 | 188 | 94.5 | 4.04 | 0.01 | 94.2 |
| Comparative Example 1 | 186 | 88.4 | 4.04 | 0.11 | 86.1 |

TABLE 5

| | First-Cycle Discharge Capacity (mAh/g) | Capacity Retention Rate (%) | First-Cycle Average Operation Voltage (V) | Magnitude of Average Operation Voltage Drop (V) | Energy Density Retention Rate (%) |
|---|---|---|---|---|---|
| Example 8 | 184 | 91.7 | 4.00 | −0.02[2] | 92.2 |
| Example 9 | 185 | 89.2 | 4.00 | −0.02[2] | 89.7 |
| Example 10 | 184 | 90.9 | 4.00 | −0.04[3] | 91.8 |
| Comparative Example 2 | 184 | 86.5 | 4.02 | 0.02 | 86.0 |

2) The average operation voltage of the 20th cycle rose by 0.02 V compared with the average operation voltage of the first cycle.
3) The average operation voltage of the 20th cycle rose by 0.04 V compared with the average operation voltage of the first cycle.

TABLE 6

| | First-Cycle Discharge Capacity (mAh/g) | Capacity Retention Rate (%) | First-Cycle Average Operation Voltage (V) | Magnitude of Average Operation Voltage Drop (V) | Energy Density Retention Rate (%) |
|---|---|---|---|---|---|
| Example 11 | 178 | 96.0 | 3.99 | 0.00 | 96.0 |
| Example 12 | 179 | 96.0 | 3.99 | 0.00 | 96.0 |
| Comparative Example 3 | 178 | 93.7 | 3.97 | 0.10 | 91.3 |

The invention claimed is:

1. A positive electrode active substance for a lithium secondary battery, comprising a mixture of a titanium-containing lithium cobalt composite oxide particle and an inorganic fluoride particle,
   wherein the titanium-containing lithium cobalt composite oxide particle comprises Ti present in a state of a solid solution at least in an interior of the titanium-containing lithium cobalt composite oxide particle,
   the inorganic fluoride particle comprises $MgF_2$ and/or $AlF_3$.

2. The positive electrode active substance for a lithium secondary battery according to claim 1, wherein a content of Ti in the titanium-containing lithium cobalt composite oxide particle is, in terms of Ti atoms, 0.05 to 2.0% by mol with respect to Co atoms in the lithium cobalt composite oxide particle.

3. The positive electrode active substance for a lithium secondary battery according to claim 1, wherein the titanium-containing lithium cobalt composite oxide particle comprises one or two or more selected from the group consisting of Ca, Mg, Sr, Zr, Al, Nb, B and W (M elements).

4. The positive electrode active substance for a lithium secondary battery according to claim 3, wherein the titanium-containing lithium cobalt composite oxide particle comprises one or two or more selected from Ca, Mg, Sr, Zr and Al as the M elements.

5. The positive electrode active substance for a lithium secondary battery according to claim 3, wherein the titanium-containing lithium cobalt composite oxide particle comprises Mg, Sr, Zr and Al as the M elements.

6. The positive electrode active substance for a lithium secondary battery according to claim 1, wherein a content of the inorganic fluoride particle is, in terms of F atoms, 0.05 to 2.0% by mol with respect to Co atoms in the titanium-containing lithium cobalt composite oxide particle.

7. A method for producing a positive electrode active substance for a lithium secondary battery, the method comprising a first step of subjecting a titanium-containing lithium cobalt composite oxide particle and an inorganic fluoride particle to a mixing treatment to thereby obtain a mixture of the titanium-containing lithium cobalt composite oxide particle and the inorganic fluoride particle,
   wherein the titanium-containing lithium cobalt composite oxide particle comprises Ti present in a state of a solid solution at least in an interior of the titanium-containing lithium cobalt composite oxide particle,
   the inorganic fluoride particle comprises $MgF_2$ and/or $AlF_3$.

8. The method for producing a positive electrode active substance for a lithium secondary battery according to claim 7, wherein the mixing treatment of the first step is carried out by dry mixing.

9. The method for producing a positive electrode active substance for a lithium secondary battery according to claim 8, wherein the dry mixing treatment of the first step is carried out in the presence of water.

10. The method for producing a positive electrode active substance for a lithium secondary battery according to claim 7, wherein the mixing treatment of the first step is carried out by wet mixing.

11. The method for producing a positive electrode active substance for a lithium secondary battery according to claim 7, the method further comprising a second step of subjecting the mixture of the titanium-containing lithium cobalt composite oxide particle and the inorganic fluoride particle obtained by carrying out the first step to a heat treatment.

12. The method for producing a positive electrode active substance for a lithium secondary battery according to claim 11, wherein a temperature of the heat treatment in the second step is 200 to 1,100° C.

13. The method for producing a positive electrode active substance for a lithium secondary battery according to claim 7, wherein the titanium-containing lithium cobalt composite oxide particle comprises one or two or more selected from the group consisting of Ca, Mg, Sr, Zr, Al, Nb, B and W (M elements).

14. A lithium secondary battery, comprising, as a positive electrode active substance, a positive electrode active substance for a lithium secondary battery according to claim 1.

\* \* \* \* \*